United States Patent
Ellicott

(10) Patent No.: US 9,162,290 B2
(45) Date of Patent: Oct. 20, 2015

(54) CENTER SPACER BETWEEN WORKPIECE AND DEAD CENTER OF MACHINE TOOL

(71) Applicant: Caterpillar, Inc., Peoria, IL (US)

(72) Inventor: Gabriel John Ellicott, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 335 days.

(21) Appl. No.: 13/856,521

(22) Filed: Apr. 4, 2013

(65) Prior Publication Data
US 2014/0301862 A1    Oct. 9, 2014

(51) Int. Cl.
*B23Q 1/76* (2006.01)
*B23B 23/02* (2006.01)

(52) U.S. Cl.
CPC . *B23B 23/02* (2013.01); *B23Q 1/76* (2013.01); *Y10T 82/10* (2015.01); *Y10T 82/2568* (2015.01); *Y10T 82/2572* (2015.01); *Y10T 82/2593* (2015.01); *Y10T 82/27* (2015.01)

(58) Field of Classification Search
CPC ............ B23B 2215/76; B23B 2222/88; B23B 2222/84; B23B 13/126; B23B 29/16; B23B 23/02; B23B 23/025; B23B 23/00; B23Q 1/76; Y10T 82/2593; Y10T 82/27; Y10T 82/2568; Y10T 82/2572; Y10T 82/2597

USPC ............. 82/162, 170, 150, 152, 164; 409/219
See application file for complete search history.

(56) References Cited

U.S. PATENT DOCUMENTS

| | | | | |
|---|---|---|---|---|
| 1,681,087 A | * | 8/1928 | Becker | 82/150 |
| 1,717,047 A | * | 6/1929 | Litvinas | 82/129 |
| 2,397,371 A | * | 3/1946 | Reynolds | 82/150 |
| 4,631,995 A | * | 12/1986 | Vroenen | 82/164 |
| 5,527,400 A | * | 6/1996 | Smith et al. | 148/537 |
| 2002/0029668 A1 | * | 3/2002 | Kroisandt | 82/53 |
| 2004/0157001 A1 | * | 8/2004 | Grinberg et al. | 427/455 |
| 2010/0028197 A1 | * | 2/2010 | Heazle | 420/448 |
| 2010/0154214 A1 | * | 6/2010 | Hsu et al. | 29/889.21 |
| 2012/0058363 A1 | * | 3/2012 | Verpoort et al. | 428/649 |
| 2012/0171469 A1 | * | 7/2012 | Shmyreva et al. | 428/332 |

* cited by examiner

*Primary Examiner* — Daniel Howell
*Assistant Examiner* — Nicole N Ramos

(57) ABSTRACT

A machine tool for supporting and rotating a workpiece includes a first machine center supporting a first workpiece end of the workpiece. A dead center defines a second machine center of the machine tool. A center spacer has a first spacer end rotatably supported on the second machine center and a second spacer end supporting a second workpiece end of the workpiece. A drive mechanism is configured to rotate the workpiece and, during rotation of the workpiece, the center spacer is configured to rotate with the workpiece about the second machine center. The second workpiece end includes a first material and the center spacer includes a second material that is different than the first material.

18 Claims, 1 Drawing Sheet

CENTER SPACER BETWEEN WORKPIECE AND DEAD CENTER OF MACHINE TOOL

TECHNICAL FIELD

The present disclosure relates generally to a center spacer for use with a machine tool that supports and rotates a workpiece, and more particularly to a center spacer positioned between an end of the workpiece and a dead center of the machine tool.

BACKGROUND

A lathe is a type of machine tool that is used to support and rotate a workpiece about its axis. In particular, a lathe may allow the workpiece to be rotated and turned while another tool performs a machining operation on the workpiece. While a variety of different operations may be performed relative to the workpiece, including various grinding and cutting operations, the operations typically result in a workpiece having symmetry about its axis of rotation.

According to one example, a turbocharger, used to boost an engine's horsepower, may include components manufactured using a lathe. In particular, a turbine wheel assembly of the turbocharger typically includes a turbine wheel welded onto a shaft. The welding process may be followed by turning the shaft diameter on a lathe prior to precision grinding of the shaft to tight tolerances. Tight tolerances regarding dimensions and surface qualities of the turbine wheel assembly are important as they greatly influence performance of the turbocharger. As a result of the precision required for this exemplary machining process and others, there is a continuing need for improved tools and techniques used in machining processes performed using lathes and other similar machine tools.

The present disclosure is directed to one or more of the problems or issues set forth above.

SUMMARY OF THE DISCLOSURE

In one aspect, a machine tool for supporting and rotating a workpiece includes a first machine center supporting a first workpiece end of the workpiece. A dead center defines a second machine center of the machine tool. A center spacer has a first spacer end rotatably supported on the second machine center and a second spacer end supporting a second workpiece end of the workpiece. A drive mechanism is configured to rotate the workpiece and, during rotation of the workpiece, the center spacer is configured to rotate with the workpiece about the second machine center. The second workpiece end includes a first material and the center spacer includes a second material that is different than the first material.

In another aspect, a method of supporting and rotating a workpiece with a machine tool includes a step of supporting a first workpiece end of the workpiece with a first machine center of the machine tool. The method also includes steps of supporting a first spacer end of a center spacer with a second machine center of the machine tool, and supporting a second workpiece end of the workpiece with a second spacer end of the center spacer. The second workpiece end includes a first material and the center spacer includes a second material that is different than the first material. The method also includes a step of rotating the workpiece with a drive mechanism. This rotating step includes rotating the center spacer with the workpiece about the second machine center, which is a dead center.

In another aspect, a shaft of a turbine wheel assembly for a turbocharger manufactured by a process disclosed herein is provided. The process includes steps of supporting a first workpiece end of the shaft with a first machine center of a machine tool, and supporting a first spacer end of a center spacer with a second machine center, which is a dead center, of the machine tool. The process also includes a step of supporting a second workpiece end of the shaft with a second spacer end of the center spacer. The second workpiece end includes a first material and the center spacer includes a second material that is different than the first material. The process also includes a step of rotating the shaft with a drive mechanism. The rotating step includes rotating the center spacer with the shaft about the second machine center.

DETAILED DESCRIPTION

Figure 1:
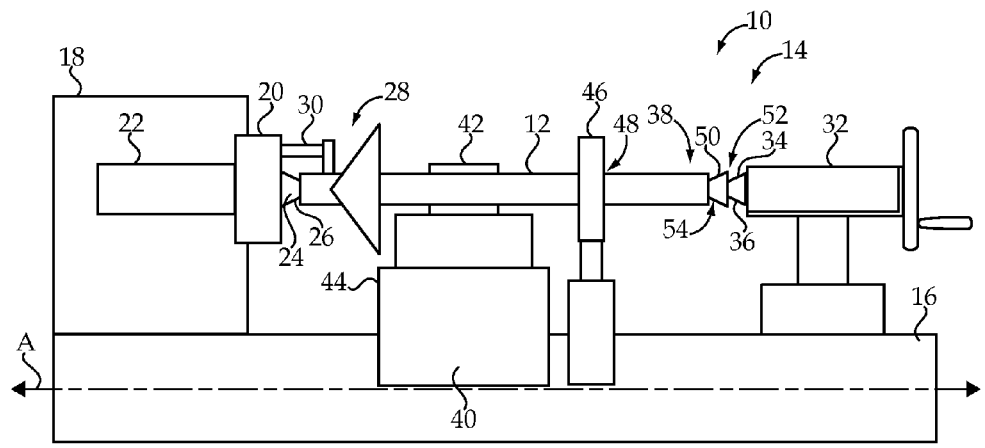
FIG. 1 is a side diagrammatic view of an exemplary machine tool for supporting and rotating a workpiece, according to the present disclosure.

An exemplary embodiment of a machine tool 10 for supporting and rotating a workpiece 12 is shown generally in FIG. 1. The machine tool 10, shown as a lathe 14, may generally include a platform 16, also referred to as a bed, that functions as a base for various components of the machine tool 10. A headstock 18 is supported on the platform 16 and houses a spindle 20 and a drive mechanism 22 for rotating the spindle 20. An electric motor or other drive mechanism may be used to rotate the spindle 20, as is know to those skilled in the art. The spindle 20 may be rotatably supported on or integrated with a shaft that supports a chuck or other fitting for supporting a first machine center 24. The first machine center 24 may be a dead center 26 (i.e., one that does not turn freely) for supporting a first workpiece end 28 of the workpiece 12. As the spindle 20 is rotated, a carrier assembly 30, for example, may likewise rotate the workpiece 12 about the first machine center 24.

A tailstock 32 may be located at an opposite end of the platform 16 from the headstock 18 and may be movable along a longitudinal axis A of the platform 16. As shown, the tailstock 32 supports a second machine center 34, which, according to the exemplary embodiment, is also a dead center 36, for securing the workpiece 12 during rotation. According to the present disclosure, and as will be discussed in greater detail below, the second machine center 34 indirectly supports a second workpiece end 38 of the workpiece 12. The tailstock 32, as should be appreciated, may be movable toward the headstock 18 to secure the workpiece 12 between the first machine center 24 and the second machine center 34 in a manner known to those skilled in the art.

A carriage 40 supports and positions a cutting tool 42 along the platform 16 relative to the workpiece 12. In particular, the carriage 40 may include a housing 44 for supporting the cutting tool 42, which may be any of a variety of known cutting tools, used to machine the workpiece 12. The carriage 40, like the tailstock 32, is typically movable along the longitudinal axis A of the platform 16 to allow repositioning of the cutting tool 42 relative to the workpiece 12 as the workpiece 12 rotates. Although not shown, it should be appreciated that additional components, such as ways, are typically provided on the platform 16 and define tracks along which the carriage 40 and tailstock 32 may be movable. The ways of the platform 16 may help align components of the machine tool 10 and maintain accuracy of the machining operation. It should be appreciated that the main components of the machine tool 10 are generally known and, thus, will not be described in greater detail herein. Components, in addition to these main components, may also be used with the machine tool 10 without deviating from the scope of the present disclosure.

Some workpieces, including long workpieces may require a steadyrest 46 for supporting the workpiece 12 on the machine tool 10 at a substantially central position of the workpiece 12. The steadyrest 46 may be mounted on the platform 16 and may provide a relatively stationary support for the workpiece 12. Although not shown in detail, the steadyrest 12 may include various contact points for supporting the workpiece 12 at a center of the steadyrest 46, as is known to those skilled in the art. Various embodiments of the steadyrest 46 exist, including embodiments configured for attachment to the carriage 40. Although some steadyrests may include components that are rotatable with the workpiece 12, components of the exemplary steadyrest 46 remain stationary while the workpiece 12 rotates within the streadyrest 46. As shown, the steadyrest 46 may be positioned to support the workpiece 12 at a steadyrest support diameter 48 of the workpiece 12.

According to the present disclosure, a center spacer 50 is provided for use with the machine tool 10. The center spacer 50, which will be described in greater detail below, has a first spacer end 52 rotatably supported on the second machine center 34 and a second spacer end 54 supporting the second workpiece end 38 of the workpiece 12. Thus, as stated above and according to the present disclosure, the second machine center 34 indirectly supports, i.e., supports without contacting, the second workpiece end 38. During rotation of the workpiece 12, as described above, the center spacer 50 is configured to rotate with the workpiece 12 about the second machine center 34.

Figure 2:
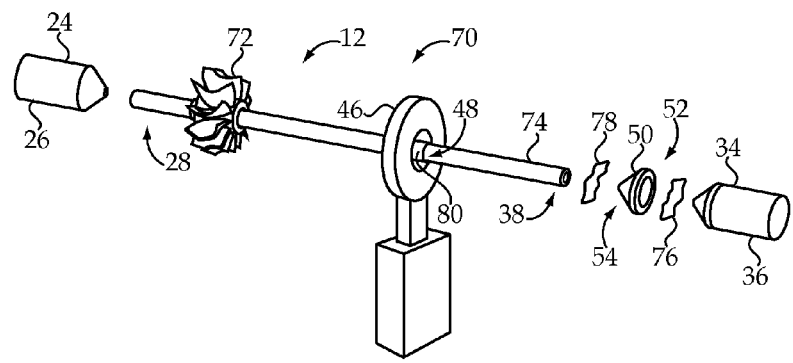
FIG. 2 is an exploded perspective view of the workpiece and supporting components of FIG. 1, including a center spacer, according to the present disclosure.

Turning now to FIG. 2, the exemplary workpiece 12 and machine tool components supporting the workpiece 12 will be discussed in greater detail. According to a specific example, the workpiece 12 may be a turbine wheel assembly 70 of a turbocharger. In particular, the turbine wheel assembly 70 may include a turbine wheel 72 welded, or otherwise affixed, onto a shaft 74. According to the exemplary embodiment, the second workpiece end 38 may include all or portions of the shaft 74, including the portion supported indirectly by the second machine center 34, and may be made from or may include a first material that is different from the one or more materials of the first workpiece end 28. The first workpiece end 28 may generally include the turbine wheel 72 and portions of the turbine wheel assembly 70 between the turbine wheel 72 and the first machine center 24. According to the exemplary embodiment, the first material of the turbine wheel assembly 70 may be titanium or a titanium alloy, while the remaining portions of the turbine wheel assembly 70, including the turbine wheel 72, may be made from steel.

To support the turbine wheel assembly 70 on the machine tool 10, the first workpiece end 28 may be supported on the first machine center 24, in a manner known to those skilled in the art, and the second workpiece end 38 may be supported on the second machine center 34 using the center spacer 50. The center spacer 50 may have a hollow conical shape, as shown, and, preferably has a profile similar to, but slightly larger than, that of the second machine center 34 such that at least the tapered portion of the second machine center 34 may be telescopically received within the hollow portion of the center spacer 50. In particular, the first spacer end 52 opens toward and receives the second machine center 34. The second spacer end 54 of the center spacer 50, according to the exemplary embodiment, terminates in a point and may have an angle matching the angle of the second machine center 34. The center spacer 50 may be made from or may include a second material that is different from the first material. Thus, according to the exemplary embodiment, the center spacer 50 does not include titanium. According to one example, the center spacer 50 may be made from or may include steel.

A lubricant 76 may be provided between the first spacer end 52 of the center spacer 50 and the second machine center 34 to facilitate rotation of the center spacer 50 about the second machine center 34. In particular, a known lubricant 76 may be provided to reduce the occurrence of friction welding between the first spacer end 52 and the second machine center 34. Further, a known adhesive 78 may be provided between the second spacer end 54 of the center spacer 50 and the second workpiece end 38 of the workpiece 12 to ensure the center spacer 50 rotates with the workpiece 12, which, as shown, may be a turbine wheel assembly 70.

According to some embodiments, the steadyrest support diameter 48 of the second workpiece end 38 of the workpiece 12, which represents the portion of the workpiece 12 that may be contacted by portions of the steadyrest 46, may include a third material that is different than the first material. That is, the steadyrest support diameter 48 may be provided with a band 80 of an intervening material, which is preferably not titanium. For example, steel, or another material, may be sprayed on the workpiece 12, or turbine wheel assembly 70, at the steadyrest support diameter 48 using a thermal spray coating process. The steel, or other intervening material, may later be removed from the steadyrest support diameter 48 of the workpiece 12 after the machining process on the machine tool 10 is completed.

Industrial Applicability

The present disclosure may be applicable to a machine tool, such as a lathe, for supporting and rotating a workpiece. Further, the present disclosure may be applicable to supporting and rotating a workpiece using at least one dead center of the machine tool. An exemplary workpiece may include a turbine wheel assembly of a turbocharger that includes a turbine wheel and a titanium shaft.

Referring generally to FIGS. 1 and 2, an exemplary machine tool 10 for supporting and rotating a workpiece 12 may generally include a platform 16. A headstock 18 may be supported on the platform 16 and may house a spindle 20 and a drive mechanism 22 for rotating the spindle 20. The spindle 20 may be rotatably supported on or integrated with a shaft that supports a chuck or other fitting for supporting a first machine center 24. A tailstock 32 may be located at an opposite end of the platform 16 from the headstock 18 and may support a second machine center 34.

According to a specific example, a turbine wheel assembly 70 may be manufactured, at least in part, using the machine tool 10. In particular, a turbine wheel 72, positioned at a first workpiece end 28, may be welded, or otherwise affixed, onto a shaft 74, which may define a second workpiece end 38. The welding process may be followed by turning the shaft diameter on the machine tool 10 prior to precision grinding of the shaft 74 to tight tolerances. Tight tolerances regarding dimensions and surface qualities of the turbine wheel assembly 70 are important as they greatly influence performance of the turbocharger. Thus, machine dead centers may be preferred for supporting the turbine wheel assembly 70, as opposed to live machine centers that may permit unacceptable runout.

Due to the magnitude of the force required from the turbine wheel assembly 70 during operation in a turbocharger, the shaft 74 may be made from titanium. In particular, the second workpiece end 38 of the exemplary workpiece 12 may include titanium, which is known for its high strength and light weight. Although titanium has many desirable qualities, it may present difficulties during machining using the machine tool 12. In particular, for example, titanium is a poor conductor of heat and, during a machining process, heat may concentrate at the machining location. The excess heat and/or the high elasticity of titanium may result in deformation of the shaft 74 and the cutting tool 42. As a result, the tight tolerances of the turbine wheel assembly 70 may not be achieved.

To maintain tight tolerances while machining the titanium shaft 74, a center spacer 50, as disclosed herein, may be used. In particular, to support the turbine wheel assembly 70 on the machine tool 10, the first workpiece end 28, which may include or be made from a material other than titanium, may be supported on the first machine center 24, which is a dead center 26. The second workpiece end 38, which includes or is made from titanium, may be indirectly supported on the second machine center 34, which is also a dead center 36. In particular, a first spacer end 52 of the center spacer 50 may be supported on the second machine center 34 and may include a lubricant 76 positioned therebetween to facilitate rotation of the center spacer 50 about the second machine center 34. The second workpiece end 38 may be supported on the second spacer end 54 of the center spacer 50 with an adhesive 78 positioned therebetween to ensure rotation of the turbine wheel assembly 70 with the center spacer 50 as it rotates about the second machine center 34.

The center spacer 50 may include or be made from steel, or another suitable material that is different than titanium, to function as an intervening material between the titanium shaft 74 and the dead center 36 to reduce deformation that may otherwise occur without the use of the center spacer 50. In addition, an intervening material may be applied to a steadyrest support diameter 48 of the titanium shaft 74, as shown at band 80. In particular, for example, a steel, or other suitable material, may be sprayed on the titanium shaft 74 at the steadyrest support diameter 48 to act as an intervening material between a steadyrest 46, configured and positioned to support the turbine wheel assembly 70, and the titanium shaft 74 to reduce deformation that may otherwise occur without the use of the band of intervening material 80.

After the turbine wheel assembly 70 is supported on the machine tool 10, the drive mechanism 22 may rotate the spindle 20, which may rotate the turbine wheel assembly 70 using a carrier assembly 30, or other similar mechanism. A carriage 40 may support and position a cutting tool 42 along the platform 16 relative to the turbine wheel assembly 70 as the turbine wheel assembly 70 is rotated. During rotation of the turbine wheel assembly 70, the center spacer 50 rotates with the turbine wheel assembly 70 about the dead center 36. As such, the cutting tool 42 may be able to achieve tight tolerances.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine tool for supporting and rotating a workpiece, comprising:
   a first machine center supporting a first workpiece end of the workpiece;
   a dead center defining a second machine center;
   a center spacer having a first spacer end rotatably supported on the second machine center and a second spacer end supporting a second workpiece end of the workpiece;
   an adhesive between the second spacer end and the second end of the workpiece; and
   a drive mechanism configured to rotate the workpiece;
   wherein, during rotation of the workpiece, the center spacer is configured to rotate with the workpiece about the second machine center;
   wherein the second workpiece end includes a first material and the center spacer includes a second material that is different than the first material.

2. The machine tool of claim 1, further including a lubricant between the first spacer end and the second machine center.

3. The machine tool of claim 1, further including a steadyrest positioned to support the workpiece at a steadyrest support diameter of the second workpiece end, wherein the steadyrest support diameter includes a third material that is different than the first material.

4. The machine tool of claim 3, wherein the first material includes titanium.

5. The machine tool of claim 4, wherein the second and third materials include steel.

6. The machine tool of claim 1, wherein the first material includes titanium.

7. The machine tool of claim 6, wherein the second material includes steel.

8. The machine tool of claim 1, wherein the first machine center is a dead center.

9. The machine tool of claim 1, wherein the center spacer has a substantially conical shape and opens at the second machine center.

10. The machine tool of claim 1, wherein the workpiece is a shaft of a turbine wheel assembly for a turbocharger.

11. A method of supporting and rotating a workpiece with a machine tool, comprising steps of:
    supporting a first workpiece end of the workpiece with a first machine center of the machine tool;
    supporting a first spacer end of a center spacer with a second machine center of the machine tool, wherein the second machine center is a dead center;
    supporting a second workpiece end of the workpiece with a second spacer end of the center spacer, wherein the second workpiece end includes a first material and the center spacer includes a second material that is different than the first material;
    applying an adhesive between the second spacer end and the second end of the workpiece; and
    rotating the workpiece with a drive mechanism;
    wherein the rotating step includes rotating the center spacer with the workpiece about the second machine center.

12. The method of claim 11, wherein the first material includes titanium.

13. The method of claim 12, further including supporting the workpiece with a steadyrest at a steadyrest support diameter of the second workpiece end during the rotating step.

14. The method of claim 13, further including applying a third material that is different than the first material at the steadyrest support diameter prior to the rotating step.

15. The method of claim 14, wherein the second material and the third material include steel.

16. The method of claim 15, wherein the applying step includes spraying steel on the workpiece at the steadyrest support diameter using a thermal spray coating process.

17. The method of claim 11, wherein the workpiece is a shaft of a turbine wheel assembly for a turbocharger.

18. A machine tool for supporting and rotating a workpiece, comprising:
- a first machine center supporting a first workpiece end of the workpiece;
- a dead center defining a second machine center;
- a center spacer having a first spacer end rotatably supported on the second machine center and a second spacer end supporting a second workpiece end of the workpiece;
- a lubricant between the first spacer end and the second machine center;
- an adhesive between the second spacer end and the second end of the workpiece; and
- a drive mechanism configured to rotate the workpiece;
- wherein, during rotation of the workpiece, the center spacer is configured to rotate with the workpiece about the second machine center;
- wherein the second workpiece end includes a first material and the center spacer includes a second material that is different that the first material.

\* \* \* \* \*